United States Patent [19]

Verkade

[11] 4,276,195
[45] Jun. 30, 1981

[54] CONVERTING HOMOGENEOUS TO HETEROGENEOUS CATALYSTS

[75] Inventor: John G. Verkade, Ames, Iowa

[73] Assignee: Iowa State University Research Foundation, Inc., Ames, Iowa

[21] Appl. No.: 105,942

[22] Filed: Dec. 20, 1979

[51] Int. Cl.$^3$ .......................... B01J 31/12; B01J 31/02
[52] U.S. Cl. .............................. 252/431 P; 252/431 R; 252/429 R
[58] Field of Search ............ 252/431 R, 431 P, 429 R

[56] References Cited

U.S. PATENT DOCUMENTS 3,595,890  7/1971  Huerta .............................. 252/431 P Primary Examiner—John F. Niebling
Attorney, Agent, or Firm—Zarley, McKee, Thomte, Voorhees & Sease

[57] ABSTRACT

Homogeneous transition metal complex catalysts for organic industrial processes are converted to catalysts which are heterogeneous with respect to the reactants, and which have substantially equal catalytic activity to the homogeneous catalysts. This is done by reacting a normally homogeneous transition metal complex catalyst with a metal bridging ligand which substantially duplicates the ligand moiety of the metal complex, to provide a polymerized, normally solid, heterogeneous phase, transition metal complex catalyst.

14 Claims, No Drawings

CONVERTING HOMOGENEOUS TO HETEROGENEOUS CATALYSTS

GRANT REFERENCE

The Government has rights in this invention pursuant to Grant No. CHE-78-18937 and IPA No. 0012 awarded by the National Science Foundation.

BACKGROUND OF THE INVENTION

Many well known organic synthesis reactions are conducted in the presence of transition metal complex catalysts such as $Ni[P(OMe)_3]_4$, that is tetrakis trimethylphosphite nickel (0). Typical examples of the type of reactions which may be catalyzed with such transition metal complexes, include isomerization, hydrogenation, hydrocyanation, olefin metathesis, hydroformylation, hydrosilylation and olefin polymerization. For further details of such types of reactions and the catalysts used, see *Transition Metals in Homogeneous Catalysis*, (Ed.) Schrauzer, Marcel Rekker, Inc. (1971), particularly pages 14 to 51 and 149–216, which are incorporated herein by reference.

It is known that reactions of the basic types mentioned above are most efficient if the catalyst is in a different phase than the reactants. For example, if the reactants are liquid and the catalyst solid, it is advantageous in that the catalyst can easily be separated from the pure product. Also, recycle of the catalyst is much easier.

Other advantages which flow from use of catalyst systems which are heterogeneous, that is, of a different phase than the reactants, include advantages in clean-up of the system (simple filtering of the catalyst after the reaction) and catalyst economics since recycle is much easier. However, by far the most important advantages of a heterogeneous versus a homogeneous catalyst system, especially in industrial processes, is that soluble products are not contaminated with catalyst material in heterogeneously catalyzed reactions; also, equally as important, heterogeneous catalysts lend themselves much more easily to continuous processes which of course, are most often far more economical than batch processes.

In the past, attempts have been made to heterogenize normally homogeneous organo-metallic catalysts, see, for example, G. Manecke and W. Storck, Angew, Chem. (Eng.) 17 (1978) 657; A. K. Smith and J. M. Basset, J. Molec. Cat., 2 (1977) 229; J. C. Bailar, Catal. Rev. Sci, Eng., 10 (1974) 17; R. H. Grubbs, Strem Chemiker, IV (1976) 3; and C. U. Pittman and G. O. Evans, Chem. Technol., 3 (1973) 560. The most common approach is to anchor the normally used organometallic catalyst on a polymer support system. One such technique is to functionalize polystyrene with $-PR_2$ groups. The $-PR_2$ groups act as a complexation site for the metal moiety. However, disadvantages occur with this system of supporting homogeneous catalysts on polymers. Catalytic longevity may be sacrificed and, catalyst recycle is difficult because the catalyst is attached to supporting polymer structures, normally by only one coordination site. In contrast to the previous use of conventional polymer support structures reported in the literature cited herein, the present invention employs a technique of conversion of homogeneous catalysts to heterogeneous analogs by use of polydentate ligands which connect metal moieties, thus securing the metal atom in the polymer matrix by more than one coordination site. The technique has wide versatility. It produces a solid polymer which itself functions as the catalyst without need for any supporting substrate like polystyrene resin; and the polymerized heterogeneous catalyst functions substantially equally with respect to catalytic activity as the "parent" homogeneous catalyst.

Accordingly a primary object of this invention is to provide a technique of converting normally homogeneous transition metal complex catalysts to heterogeneous phase catalysts of substantially equal catalytic activity as the normally homogeneous phase "parent" catalyst.

Another object of this invention is to provide a catalyst conversion technique which is convenient to use, simple, economical, and which allows practice of industrial processes which normally employ homogeneous catalysts, now for the first time in many instances, with heterogeneous catalysts, thus obtaining the benefits which normally flow therefrom, such as significant reduction of catalyst contamination in products, greater ease of conducting continuous processes, easier removal of the catalyst after the reaction is completed, and catalyst recycle.

An even further object of this invention is to prepare heterogeneous catalysts from "parent" normally homogeneous organometallic transition metal complex catalysts with the heterogeneous polymerized catalysts being substantially equal in catalytic activity to the homogeneous "parent" catalyst.

And a still further object is to develop a catalyst conversion method which has general applicability and may be used for converting transition metal complex catalysts of nearly any industrial reaction from same-phase, homogeneous catalyst to different-phase, heterogeneous, polymer catalysts.

The method and manner of accomplishing these as well as other objects will become apparent from the detailed description of the invention, which follows.

SUMMARY OF THE INVENTION

In accordance with this invention, normally homogenous transition metal complex catalysts have the ligand structure of the transition metal complex at least partially replaced with a closely related ligand structure which contains more than one ligating center. As a result, a polymer structure is formed which is solid and, importantly, the solid polymer, when used has been found to be substantially equal in catalyzing effectiveness with the known, "parent" homogeneous catalyst.

DETAILED DESCRIPTION OF THE INVENTION

Many commonly employed industrial chemical processes use transition metal complexes which are organometallic structures formed by bonding between a transition metal and an organic ligand. For purposes of illustration from time to time, such complexes are represented herein by "M-L", wherein "M" represents the transition metal and "L" represents the ligand. The term "ligand" as used herein, is used in its ordinary sense to designate a molecule, ion or atom that is attached to the transition metal atom of a coordination compound. Thus, for example, with respect to the homogeneous olefin isomerization catalyst $Ni[P(OMe)_3]_4$, the tetrakis trimethylphosphite structure is the ligand moiety.

The transition metal, that is, "M" may represent any of the transition metals normally employed in making transition metal, organometallic complex catalysts. Generally these metals of groups IVB, VB, VIB, VIIB, VIIIB and IB of the periodic chart. The most commonly employed are titanium, vanadium, chromium, manganese, iron, cobalt, nickel, zirconium, molybdenum, ruthenium, rhodium, palladium, tantalum, osmium, and iridium. With respect to the present invention, while any of those previously mentioned herein may be employed, those most preferably utilized are iron, rhodium, nickel, molybdenum, cobalt, palladium, and titanium. However, the preference is merely a practical one, since there are the most commonly employed metals for transition metal catalyst formation. It therefore is to be understood that virtually any transition metal complex, wherein the complex itself is homogeneous with respect to the reaction which it is catalyzing, may be converted in accordance with the techniques of this invention, to a heterogeneous, polymerized catalyst.

With respect to the ligand moiety of the transition metal organic ligand complex, that is, "L", likewise the possibilities run the gamut of traditionally used ligand complexes. From time to time herein, the term "parent" will be used with respect to the homogeneous catalyst. It is to be understood that this term refers to the starting homogeneous catalyst, the ligand portion of which is at least partially replaced by a mimicking ligand in order to provide the polymerized heterogeneous catalyst.

Most commonly the central atom of the organic ligand structure will be phosphorous nitrogen or sulfur, but others such as arsenic or oxygen may also be employed.

In accordance with the technique of this invention the ligand portion of the homogeneous transition metal organometallic complex is at least partially replaced with a new ligand structure. The new structure substantially mimics, to the extent possible, the ligand structure being replaced, but also has more than one ligating center. For example, if the transition metal complex has the formula ML4, two of the ligand moieties might be replaced by similar ligands in the sense that they duplicate the same central atom but, because of their own organic structure, have more than one ligating center. The importance of the additional ligating center is to allow the catalyst to be polymerized to form a heterogeneous system. For example, using the hypothetical M-L4 if one looks at the central transition metal atom (M) in the following formula, it can be seen that two of the "Ls" are replaced by L1. Now assuming L1 has more than one active ligating center, it is a unit which can be repeated to form a metal bridging ligand between respective metal atoms. As a result, a polymer is formed and a heterogeneous system will occur. The polymer might be represented as follows with the repeating unit in brackets.

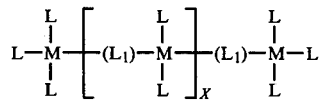

For further illustrative purposes, a specific example can be given with respect to the previously mentioned tetrakis trimethylphosphite nickel (0), that is, Ni[P(OMe)3]4. This homogeneous olefin isomerization catalyst can be converted to an efficient heterogeneous catalyst for the same reaction by adding the ligand MeOP(OCH2)2C(CH2O)2POMe, which is derived from the industrial alcohol pentaerythritol. This ligand connects nickel atoms by displacing P(OMe)3 molecules, thereby making an insoluble organometallic polymer.

As heretofore mentioned, one criterion for the replacing ligands is that they duplicate to the extent possible the structure of the ligand being replaced from the "parent" organometallic complex. They must also be polyfunctional, that is, have more than one ligating center in order that polymerization will occur. Another way of saying this is that they must be polydentate ligands, because only these can function as metal bridging ligands to connect metal moieties.

It is important that the replacing ligand duplicate to the extend possible the structure of the parent homogeneous catalyst ligand structure, in order that catalyst activity be maintained at substantially the same level. It is therefore strongly preferred in every instance that the central atom of the ligand of the parent homogeneous metal complex catalyst and that of the central atom of the replacing ligand of the polymerized heterogeneous catalyst be the same. For example, with respect to the previously mentioned "parent" nickel metal complex and the polymerized heterogeneous catalyst, in both instances the central atom of the ligand moiety is phosphorous.

While it is not known for certain, it is believed that one of the reasons that the polymeric catalyst system functions more efficiently than prior art techniques of attachment to a resin substrate, relates to stereochemistry. The polymeric catalyst system in which the metal species are connected by polydentate ligands can be envisioned as a linear, sheet, or three dimensional polymer. A unique advantage which accrues to such systems is that the metal atoms are held in the polymer by more than one coordination site, thus greatly decreasing solubilizaton of catalysts by disassociation. In conventional polymer-bound metal systems, the density of the ligating functional group is generally too low to permit binding of the metal moiety by more than one polymer anchoring group.

The polydentate ligands which are employed must be non-chelating. In other words, they must attach to the central metal atom only once, for if they have a tendency to do so more than once so that ring formation will occur, polymerization possibilities will be destroyed. Thus, molecular constraints must be present in the polydentate ligands which preclude coordination of their ligating sites to the same metal, thereby insuring polymer formation. Therefore, in summary, the requirements for selecting the replacing ligand forming the polymerized heterogeneous catalyst are threefold; (1) the replacing ligand must be polydentate, that is, have more than one ligating site in order to assure polymerization; (2) the replacing ligand must have a geometry which precludes chelation since chelation will prevent polymerization; and (3) the replacing ligand must insofar as possible, duplicate the structure of the ligand being displaced from the parent homogeneous catalyst, in order to provide substantially equal catalytic activity.

Utilizing these three criteria a synthesis chemist of ordinary skill can readily select the replacing ligands so that heterogeneous analogs of many homogeneous organometallic catalysts may be prepared. The examples which follow will further serve to illustrate this selection process.

From time to time the term "metal bridging ligand" has been used herein. It should be understood that this term is intended to mean a replacing ligand which is polydentate, and non-chelating, and therefore capable of polymerizing a homogeneous catalyst to provide a heterogeneous catalyst system. The ligands "bridge" from metal atom to metal atom in the polymer.

Importantly, the reaction in which the ligand portion of the parent transition metal complex is at least partially replaced by the metal bridging ligands of this invention, is a straight forward and simple replacement reaction. The parent catalyst and the compound containing the replacing ligand are simply reacted together in an appropriate solvent most generally at atmospheric pressure and room temperature, with stirring. The formation of a polymerized catalyst is signaled by the appearance of a precipitate. The precipitate is the polymerized heterogeneous catalyst which may thereafter be used in the reaction. The conditions for this replacement reaction will become more apparent from the examples which hereinafter follow.

It should be understood that the examples are offered as illustrative but non-limiting with respect to the scope of the invention.

EXAMPLE 1

Tetrakis trimethylphosphite nickel (0) of the formula Ni[P(OMe)$_3$]$_4$ was prepared in accordance with published literature techniques, M. Bigorgne, C. R. Acad. Sci., 250 (1960), 3484. This nickel catalyst is a known effective catalyst for olefin isomerization and hydrocyanation. The central atom of the ligand moiety is phosphorous and it was therefore determined that the polydentate ligand for at least partial replacement of the trimethylphosphite would be phosphorous containing. The polydentate ligand selected was a spirophosphite of the formula MeOP(OCH$_2$)$_2$C(CHCH$_2$O)$_2$POMe. The structure of this compound is:

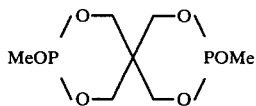

The reason a phosphite ester was chosen is that it contains the trimethylphosphite structure just as the parent ligand. This compound has the name 3,9 dimethoxy-2,4,8,10-tetraoxa-3,9 diphosphospiro-(5.5) undecane. This spirophosphite ester can be prepared in accordance with D. W. White, R. D. Bertrand, G. K. McEwen & J. G. Verkade, "Structural Implications of Nuclear Magnetic Resonance Studies on 1-R-1-phospha-2,6-dioxacyclohexanes", J. Am. Chem. Soc., 92, 7125 (1970) which is incorporated herein by reference. This technique shows derivation of the compound from the industrial alcohol pentaerythritol. Additionally, the compound is commercially available as a plasticizer from the Borg Warner Chemical Company. The spirophosphite ester precludes chelation because of its geometry. It is polydentate since it has two active ligating sites on the phosphorous atoms; and, it mimics the P(OMe)$_3$ of the nickel trimethylphosphite ester parent homogeneous catalyst which is known to function as an efficient homogeneous, olefin isomerization catalyst in acetic solutions.

0.450 (8.1×10$^{-4}$ mols) of nickel compound and 0.208 grams of the spirophosphite ester (8.1×10$^{-4}$ mols) were used in the initial replacement reaction. The nickel organometallic catalyst was dissolved in 20 ml. of acetonitrile in a 50 ml. round bottom flask which was flushed with nitrogen. To this clear solution was added the spirophosphite ester dissolved in 5 ml. of acetonitrile. Within 30 seconds a white precipitate formed.

Stirring was continued with a magnetic stirrer for 20 minutes. The acetonitrile solvent was removed along with liberated trimethylphosphite by vacuum distillation at 50° C. The precipitate was washed with acetonitrile.

Analysis of the precipitate was accomplished in the following manner. 0.0935 gr. of the polymer was placed in 47 ml. of ethylene chloride and ozone was bubbled through for two hours at −78° C. until the reaction mixture turned blue. Ozonization destroys the phosphorus-metal bonds in the polymer and converts the metal to insoluble metal oxide and the phosphite ligands to the corresponding phosphate derivatives which are soluble. $^{31}$P NMR spectroscopy of the phosphates in solution reveals that the ratio of trimethyl phosphite ligand to spirophosphite ligand is about 0.87 per metal atom in the original polymer catalyst.

EXAMPLE 2

The heterogeneous spirophosphite polymer prepared in Example 1 was utilized in an olefin isomerization reaction in the following manner. 0.6 grams of the polymer was suspended in 4 ml. of benzene. One ml. of 0.1 molar trifluoroacetic acid was added as a protonating agent. One ml. of 3-butene nitrile was added. In accordance with the known technique of this reaction, the 3-butene nitrile was isomerized to put the double bond in the 2-position. This isomerization reaction is known to commonly occur with the parent homogeneous catalyst.

When the reaction was conducted in the presence of the heterogeneous spirophosphite polymer catalyst, the white suspension became a yellow gel at the start of the reaction. The solution was monitored with infrared spectroscopy to monitor the isomerization. Infrared spectroscopy confirmed the isomerization in accordance with detection of the disappearance of a 3 position peak and the growth of a 2-position peak. The isomerization was essentially completed in about 18 hours and was over 50% completed in 3 hours.

In this reaction, the rate of catalysis and yield of isomerized product is comparable to that achieved with use of the parent, homogeneous catalyst.

EXAMPLE 3

This example shows hydrocyanation utilizing the same parent catalyst and the same polymerized heterogeneous catalyst prepared in Example 1. 0.726 gr. of the polymerized spirodiphosphate heterogeneous catalyst was mixed with 0.36 gr. of zinc chloride which functions as a Lewis acid for the reaction. Two ml. of benzene and 2 ml. of norbornadiene were added. The reaction was run at temperatures of from 60°–75° C. HCN was made by reacting phosphoric acid and sodium cyanide and it was bubbled through the reaction system with nitrogen for two hours. Under these reaction conditions with the parent organometallic complex catalyst it would be expected that the cyanide would add to the norbornadiene. When the polymerized catalyst was used, several infrared analysis tests confirmed the presence of the cyanide product. The reaction yields were comparable to those utilizing the homogeneous catalyst, even though the polymerized solid heterogeneous catalyst was employed.

It should also be mentioned that during these tests, it has been discovered that for reasons presently unknown, aging of the polymer for a 24 hour period before use as a heterogeneous catalyst seems to enhance its activity.

EXAMPLES 4–10

In the table below, Examples 4–10 are shown to illustrate processes other than isomerization and hydrocyanation, as well as to demonstrate how polyfunctional mimicking ligands may be selected for other homogeneous catalysts. In each instance, it can be seen that the replaced ligand of the homogeneous catalyst is substantially duplicated by having the same central ligating atom as the replacing polyfunctional mimicking ligand and similar substituents on the ligating atom. In addition, the replacing mimicking ligand has metal bridging capabilities since it has more than one ligating center, and its geometry prevents chelation.

If these reactions are run in accordance with known techniques, except that the heterogeneous catalyst replaces the parent homogeneous catalyst, substantially similar results will be obtained from the standpoint that the catalyst functions equally as effectively as the parent homogeneous catalyst; and has the advantages of heterogeneity.

It can therefore be seen that a technique of wide scale use for conversion of homogeneous catalysts to heterogeneous catalysts has been provided. And importantly the heterogeneous catalyst are generally equal in activity with the parent homogeneous catalysts.

TABLE

Examples 4-10

| Catalyzed Reaction Type | Example | Homogeneous Catalyst | Ligand to be Mimicked | Polyfunctional Mimicking Ligand | Heterogeneous Catalyst | Reactants(s) | Product |
|---|---|---|---|---|---|---|---|
| Hydrogenation | (4) | $RhCl_3(SR_2)_3$ | $SR_2$ | $RSCH_2-C_6H_4-CH_2SR$ | $[RhCl_3(SR_2)_2RSCH_2-C_6H_4-CH_2SR]_x$ | $RCH=CH_2 + H_2$ | $RCH_2CH_3$ |
| Isomerization | (5) | $NiCl_2(PEt_3)_2$ | $PEt_3$ | $P(CH_2CH_2)_3P$ | $[NiCl_2(PEt_3)P(CH_2CH_2)_3P]_x$ | $CH_2=CHCH_2CH_3$ | $CH_3CH=CHCH_3$ |
| Hydrocyanation | (6) | $Ni[P(OMe)_3]_4$ | $P(OMe)_3$ | $MeOP(OCH_2)_3POMe$ (bicyclic) | $\{Ni[P(OMe)_3]_3 P(OCH_2)_3POMe\}_x$ | $CH_2=CH_2CH_2=CH_2 + HCN$ | $NC(CH_2)_4CN$ |
| Hydroformylation | (7) | $RhH(CO)(PPh_3)_3$ | $PPh_3$ | $Ph_2P-C_6H_4-PPh_2$ | $[RhH(CO)(PPh_3)_2(Ph_2P-C_6H_4-PPh_2)]_x$ | $RCH=CH_2 + H_2 + CO$ | $RCH_2CH_2CHO$ |
| Carbonylation | (8) | $RhCl(CO)(PPh_3)_2$ | $PPh_3$ | $Ph_2P-C_6H_4-PPh_2$ (ortho) | $\{RhCl(CO)(PPh_3)[P-C_6H_4-P]\}_x$ | $CH_3OH + CO$ | $CH_3CO_2H$ |
| Hydrosilylation | (9) | $IrCl(CO)(PPh_3)_2$ | $PPh_3$ | $Ph_2P-C_6H_4-PPh_2$ (meta) | $[IrCl(O)(PPh_3)(Ph_2P-C_6H_4-PPh_2)]_x$ | $RCH=CH_2 + R_3SiH$ | $RCH_2CH_2SiR_3$ |
| Olefin metathesis | (10) | $MoCl_2(NO)_2 \cdot$(pyridine) | pyridine | 4,4'-bipyridine | $\{MoCl_2(NO)_2(\text{bipy})\}_x$ | $CH_2=CH_2 + RCH=CH_2R$ | $2RCH=CH_2$ |

What is claimed is:

1. A method of converting transition metal complex catalysts, which are homogeneous with respect to the reactants for the reaction to be catalyzed, to heterogeneous phase polymerized catalysts of substantially equal catalytic activity as said homogeneous catalysts, said method comprising:
reacting said transition metal complex with a metal bridging ligand which substantially mimics the ligand moiety of said metal complex and which has more than one ligating center;
to provide a polymerized heterogeneous transition metal complex catalyst.

2. The method of claim 1 wherein said transition metal complex has the formula M-L and "M" represents any transition metal and "L" represents any organic ligand.

3. The method of claim 2 wherein said transition metal is selected from the group consisting of metals of IVB, VB, VIB, VIIB, VIIIB and IB of the periodic chart.

4. The method of claim 3 wherein said transition metal is selected from the group consisting of titanium, vanadium, chromium, manganese, iron, cobalt, nickel, zirconium, molybdenum, ruthenium, rhodium, palladium, tantalum, osmium, and iridium.

5. The method of claim 4 wherein said transition metal is selected from the group consisting of iron, rhodium, nickel, molybdenum, cobalt, palladium and titanium.

6. The method of claim 2 wherein the central atom of said organic ligand is a non-metal selected from the group consisting of phosphorous, nitrogen, sulfur and arsenic.

7. The method of claim 6 wherein said central atom of said organic ligand is selected from the group consisting of phosphorous, nitrogen and sulfur.

8. The method of claim 6 wherein said metal bridging ligand also has as its central atom the same non-metal as said central atom of said organic ligand.

9. The method of claim 7 wherein said metal bridging ligand also has as its central atom the same non-metal as said central atom of said organic ligand.

10. The process of claim 1 wherein said polymerized heterogeneous catalyst is used in the reaction it is catalyzing in the form of a suspension in a solution of the reactants.

11. The process of claim 1 wherein said polymerized heterogeneous catalyst is employed in a reaction column.

12. The method of claim 2 wherein "M" is nickel and "L" represents trimethyl phosphite.

13. The method of claim 10 wherein said metal bridging ligand is 3,9-dimethoxy-2,4,8,10,-tetraoxa-3,9-diphosphospiro-[5.5] undecane.

14. A method of converting transition metal complex catalysts which are homogeneous with respect to the reactants for the reaction they catalyze, to heterogeneous phase, polymerized catalysts of substantially equal catalytic activity to said homogeneous catalyst, said method comprising:
reacting said homogeneous transition metal complex with a polymerizing agent containing a polyfunctional mimicking ligand having the same central ligating atom as said ligand moiety of said homogeneous catalyst, the stereochemistry of said polyfunctional ligand being selected to preclude chelation, and to mimic, insofar as possible, the ligand being displaced from said transition metal complex homogeneous catalyst.

* * * * *